United States Patent
Freisinger et al.

(10) Patent No.: US 10,094,269 B2
(45) Date of Patent: Oct. 9, 2018

(54) FOUR-STROKE RECIPROCATING PISTON INTERNAL COMBUSTION ENGINE HAVING AN EXHAUST GAS TURBOCHARGER, AND OPERATING METHOD FOR SAME

(71) Applicant: Daimler AG, Stuttgart (DE)

(72) Inventors: Normann Freisinger, Lorch (DE); Juergen Friedrich, Stuttgart (DE)

(73) Assignee: Daimler AG, Stuttgart (DE)

( * ) Notice: Subject to any disclaimer, the term of this patent is extended or adjusted under 35 U.S.C. 154(b) by 50 days.

(21) Appl. No.: 15/311,795

(22) PCT Filed: May 12, 2015

(86) PCT No.: PCT/EP2015/000973
§ 371 (c)(1),
(2) Date: Nov. 16, 2016

(87) PCT Pub. No.: WO2015/176803
PCT Pub. Date: Nov. 26, 2015

(65) Prior Publication Data
US 2017/0089255 A1    Mar. 30, 2017

(30) Foreign Application Priority Data

May 17, 2014 (DE) .................. 10 2014 007 310

(51) Int. Cl.
*F02B 37/00* (2006.01)
*F02B 31/00* (2006.01)
(Continued)

(52) U.S. Cl.
CPC ............ *F02B 37/025* (2013.01); *F02B 31/00* (2013.01); *F02B 37/001* (2013.01);
(Continued)

(58) Field of Classification Search
CPC ...... F02B 37/025; F02B 37/001; F02B 31/00; F02B 2031/006; F02D 13/0242; F02D 13/0257
(Continued)

(56) References Cited

U.S. PATENT DOCUMENTS

| 4,760,821 A | 8/1988 | Aupor et al. |
| 5,794,445 A * | 8/1998 | Dungner ............... F01N 13/107 60/605.2 |
| 2015/0316005 A1* | 11/2015 | Madison ............... F02M 26/04 60/602 |

FOREIGN PATENT DOCUMENTS

| DE | 198 55 932 A1 | 6/2000 |
| DE | 102 43 473 A1 | 3/2004 |

(Continued)

OTHER PUBLICATIONS

PCT/EP2015/000973, International Search Report dated Sep. 4, 2015 (Two (2) pages).
(Continued)

*Primary Examiner* — Patrick Maines
*Assistant Examiner* — Dapinder Singh
(74) *Attorney, Agent, or Firm* — Crowell & Moring LLP

(57) ABSTRACT

A four-stroke reciprocating piston internal combustion engine is disclosed. The engine includes an even number of cylinders grouped into a first half and a second half. An exhaust gas turbocharger has a first turbine inlet and a second turbine inlet. Each of the cylinders has an intake duct with an intake opening, a first exhaust duct with a first exhaust opening, and a second exhaust duct with a second exhaust opening. The first half of cylinders is connected via the respective first exhaust ducts to the first turbine inlet and is connected via the second exhaust ducts to the second turbine inlet. The second half of cylinders is connected via the respective first exhaust ducts to the second turbine inlet and is connected via the respective second exhaust ducts to the first turbine inlet. The respective second exhaust openings have a larger diameter than the respective first exhaust openings.

8 Claims, 1 Drawing Sheet

(51) Int. Cl.
*F02D 13/02* (2006.01)
*F02B 37/02* (2006.01)
(52) U.S. Cl.
CPC ..... *F02D 13/0242* (2013.01); *F02D 13/0257* (2013.01); *F02B 2031/006* (2013.01)
(58) Field of Classification Search
USPC .............................................. 60/602, 605.2
See application file for complete search history.

(56) References Cited

FOREIGN PATENT DOCUMENTS

| | | |
|---|---|---|
| DE | 10 2004 028 482 A1 | 12/2005 |
| DE | 10 2005 055 996 A1 | 5/2007 |
| EP | 1 400 667 A2 | 3/2004 |
| EP | 2 119 888 A2 | 11/2009 |
| FR | 2 860 834 A1 | 4/2005 |
| FR | 2 916 226 A3 | 11/2008 |
| JP | 62-52206 U | 4/1987 |
| JP | 62-107230 A | 5/1987 |
| JP | 63-500194 A | 1/1988 |
| JP | 2000-170554 A | 6/2000 |
| WO | WO 86/ 05237 A1 | 9/1986 |

OTHER PUBLICATIONS

German Search Report issued in German counterpart application No. 10 2014 007 310.6 dated Oct. 14, 2015, with Statement of Relevancy (Nine (9) pages).
Japanese Office Action issued in Japanese counterpart application No. 2016-567985 dated Oct. 24, 2017, with partial English translation (Six (6) pages).

\* cited by examiner

FOUR-STROKE RECIPROCATING PISTON INTERNAL COMBUSTION ENGINE HAVING AN EXHAUST GAS TURBOCHARGER, AND OPERATING METHOD FOR SAME

BACKGROUND AND SUMMARY OF THE INVENTION

The invention relates to a four-stroke reciprocating piston internal combustion engine having an exhaust gas turbocharger, and an operating method for such an internal combustion engine.

An internal combustion engine is known from DE 102 43 473 A1, having an exhaust gas turbocharger and multiple cylinders, each with a first and a second exhaust valve per cylinder, wherein the first and the second exhaust valves are combined to form in each case a separately controllable group. Exhaust gas from exhaust gas ducts associated with a particular group of exhaust valves may be supplied to separate inlets of a twin turbine of the exhaust gas turbocharger. At low speed only one group of valves is opened, and at higher speeds the exhaust valves of both groups are opened. There is a problem on the one hand in that the residual gas content in the cylinders is undesirably high when, at comparatively low speeds, a switch is already made to an operating mode in which all exhaust valves open. On the other hand, the thermodynamic efficiency of the engine is decreased when the speed limit of the switchover is shifted to higher speeds.

The object of the invention is to provide a generic internal combustion engine and an operating method for same in which the above-mentioned disadvantages are reduced.

The four-stroke reciprocating piston internal combustion engine according to the invention has an even number of cylinders, and an exhaust gas turbocharger with two turbine inlets which are at least substantially separate from one another. At least one intake duct, with an intake opening on the combustion chamber side, for intake of combustion air into a combustion chamber of the cylinder is associated with each of the cylinders. In addition, a first and second exhaust duct, provided for discharge of exhaust gas from the combustion chamber, are associated with each of the cylinders, the first exhaust duct having a first exhaust opening on the combustion chamber side, and the second exhaust duct having a second exhaust opening on the combustion chamber side. A first and a second exhaust valve are used for controlling the exhaust gas discharge from the combustion chamber via the first and second exhaust ducts by opening and closing the first and second exhaust openings. A first half of the cylinders is connected via a respective first exhaust duct to a first of the two turbine inlets, and is connected via a respective second exhaust duct to a second of the two turbine inlets. In addition, a second half of the cylinders is connected via a respective first exhaust duct to the second turbine inlet, and is connected via a respective second exhaust duct to the first turbine inlet. According to the invention, it is provided that the second exhaust openings have a larger diameter than the first exhaust openings. Accordingly, the diameters of the valve disk of the associated first and second valves are different. This difference in sizes of the valve disk diameters and exhaust opening diameters allows improved purging of residual gas. In addition, an increase in the speed limit, in which a switch is made from an operation with actuation of only one exhaust valve to an operation with actuation of both exhaust valves of each cylinder, is made possible without decreasing the thermodynamic efficiency of the engine.

To make the best possible use of the advantages, it is provided to select the second exhaust openings or the valve disk diameter of the second exhaust valves to be at least 10%, but preferably at least 15%, 20%, or even larger, than the diameter of the first exhaust opening or the valve disk diameter of the first exhaust valves.

The engine according to the invention is preferably designed as a 4-cylinder or 6-cylinder engine, in particular having an in-line design. The associated turbocharger may be a so-called twin scroll turbocharger or a segment turbocharger.

In one embodiment of the invention, a first intake duct having a first intake opening and a second intake duct having a second intake opening are provided for each cylinder. The engine is thus designed as a so-called 4-valve engine. In another embodiment of the invention, it is particularly advantageous when the second intake openings have a larger diameter than the first intake openings. Analogously to the second exhaust openings, the second intake openings may have a diameter that is selected to be at least 10%, but preferably at least 15%, 20%, or even larger, than the diameter of the first intake openings.

In another embodiment of the invention, particularly good, stable combustion is achievable when the first intake duct is designed as a swirl duct or turbulence duct, and the second intake duct is designed as a filling duct. Swirl or turbulence which stabilizes the combustion may thus be generated in the combustion chamber. To this end, the direction of the intake duct axes is suitably oriented with respect to the cylinder axis.

Furthermore, for a good charge cycle and an advantageous combustion process, in another embodiment of the invention it is provided that the second intake openings are situated diagonally opposite from the second exhaust openings in a view of the cylinders from the top.

In another embodiment of the invention, four cylinders, one through four, for the internal combustion engine are arranged in series, the first and fourth cylinders forming the first half of the cylinders and the second and third cylinders forming the second half of the cylinders, and a firing order of one-three-four-two being provided for the cylinders. A standard counting method for the cylinders, beginning with a side opposite from the power output of the engine, is to be assumed. With the stated firing order in conjunction with the differently sized exhaust openings, it is possible to achieve a particularly low transverse influence on the purging processes and a particularly low fraction of residual gas remaining in the cylinders.

The object underlying the invention is achieved with an internal combustion engine and by an operating method in which at low speeds below a predefined lower speed limit, the first or the second exhaust openings are kept closed by their associated exhaust valves. Above a predefinable upper speed limit, the internal combustion engine is operated in such a way that the two exhaust openings are opened for all cylinders by actuating the exhaust valves in the customary manner toward the end of the power stroke, and are closed once again shortly after top dead center of the exhaust stroke. In one embodiment of the method, it is provided that the lower speed limit, as a function of load, is predefined between approximately 15% and 50% of the nominal speed of the internal combustion engine.

In another embodiment of the method, in an internal combustion engine having two intake openings per cylinder, wherein the second intake openings have a larger diameter than the first intake openings, at low speeds below a predefined speed limit of the internal combustion engine the first intake openings having the smaller diameter are kept closed by their associated intake valves. This measure as well benefits the charge cycle.

Advantageous embodiments of the invention are illustrated in the drawings and described below. The features stated above and to be explained below may be used not only in the particular stated feature combination, but also in other combinations or alone without departing from the scope of the present invention.

DETAILED DESCRIPTION OF THE DRAWINGS

Figure 1:
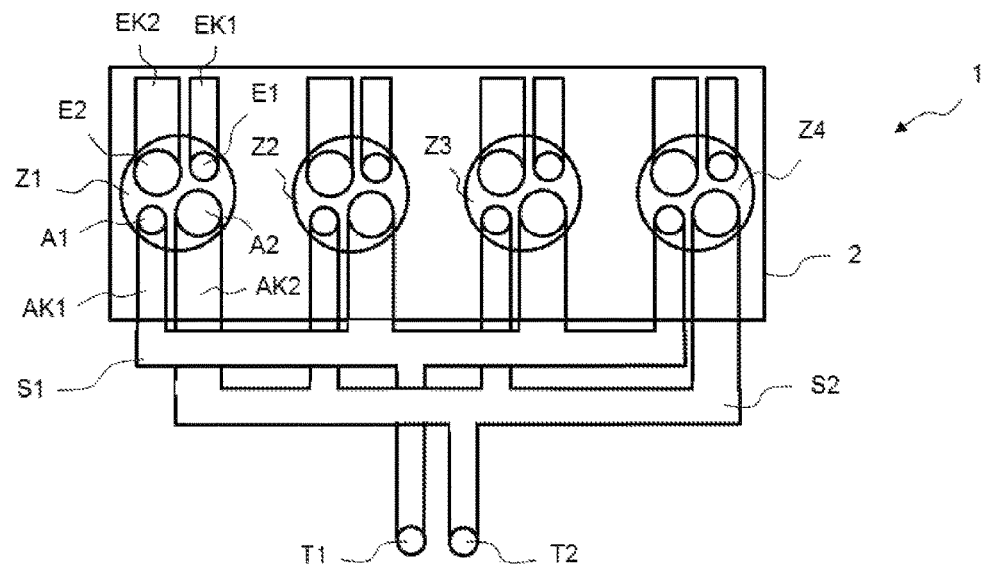
FIG. 1 shows an internal combustion engine designed according to the invention in a rough schematic diagram.

One advantageous exemplary embodiment of the internal combustion engine according to the invention is explained in greater detail below with reference to FIG. 1. The internal combustion engine 1, which is illustrated only in a rough schematic manner in FIG. 1, is shown in a top view of a cylinder head 2. In the present case, the engine 1 is designed as a reciprocating piston engine which operates according to the four-stroke principle. A design as a spark ignition gasoline engine or as a compression ignition diesel engine is possible.

In the present case, the engine 1 has four identical cylinders Z1-Z4 arranged in series. Each of the cylinders Z1-Z4 has two intake openings E1, E2 for supplying combustion air, and has associated intake valves which are not illustrated in greater detail. The intake opening denoted by reference character E1 is referred to below as the first intake opening, and the associated intake valve is referred to as the first intake valve. Analogously, the intake opening denoted by reference character E2 is referred to as the second intake opening, and the associated intake valve is referred to as the second intake valve. The diameter of the valve disks of the first and second intake valves is adapted to the preferably circular intake openings E1, E2. The supply of combustion air to the cylinders Z1-Z4 or their combustion chambers may be controlled by actuating the intake valves, for example via a camshaft which is in particular adjustable. The combustion air is suppliable to the cylinders Z1-Z4 via the first and second intake ducts EK1, EK2 associated with the first and second intake openings E1, E2, respectively.

It is provided that the first intake valves of cylinders Z1-Z4 may be controlled jointly and synchronously in order to open and close the first intake openings E1 according to a predefined or predefinable time sequence. The same applies for the second intake valves, whereby the first intake valves may preferably be controlled separately from the second intake valves.

For discharging exhaust gas from the cylinders Z1-Z4 or from the respective associated combustion chambers, the cylinders each have a first exhaust opening A1 and a second exhaust opening A2, into which a first exhaust duct AK1 and a second exhaust duct AK2, respectively, open on the combustion chamber side. A first exhaust valve is associated with a respective first exhaust opening A1, and a second exhaust valve is associated with a respective second exhaust opening A2; this is not illustrated in greater detail. Analogously to the intake valves, the diameters of the respective valve disks of the exhaust valves are adapted to the particular exhaust opening. In addition, analogously to the intake valves, discharge of exhaust gas from the cylinders Z1-Z4 or their combustion chambers is controlled by actuating the exhaust valves, for example via a camshaft which is in particular adjustable. The exhaust valves are synchronously controllable in groups.

In the present case, a firing order of 1-3-4-2 is provided for the engine 1. Beginning with an ignition event in the first cylinder Z1, ignition subsequently takes place in this sequence in cylinders Z3, Z4, and Z2, in each case offset by one stroke. To allow gas exchange which is preferably free of mutual transverse influences among the cylinders, two separate exhaust gas manifolds S1 and S2 are provided, into which the first and second exhaust ducts AK1 and AK2 of cylinders Z1-Z4 open. In the present case, the first exhaust ducts AK1 of the first cylinder Z1 and of the fourth cylinder Z4, and the second exhaust ducts AK2 of the second cylinder Z2 and of the third cylinder Z3, open into the first exhaust gas manifold S1. The other exhaust ducts AK1, AK2 of cylinders Z1-Z4 open into the second exhaust gas manifold S2. Exhaust gas received by the first exhaust gas manifold S1 is suppliable to a first turbine inlet T1 of a twin exhaust gas turbocharger, not illustrated in greater detail, having two turbine inlets T1 and T2 substantially separate from one another. For this purpose, the first manifold S1 is directly connected to the first turbine inlet T1. The second exhaust gas manifold S2 is directly connected to the second turbine inlet T2. The cylinders Z1-Z4 of the engine 1 may thus be divided into a first half formed by the first cylinder Z1 and the fourth cylinder Z4, and a second half formed by the second cylinder Z2 and the third cylinder Z3. Thus, in the first half of the cylinders the first exhaust ducts AK1 of the associated cylinders Z1 and Z4 are fluidically connected to the first turbine inlet T1, and the second exhaust ducts AK2 are fluidically connected to the second turbine inlet T2. Conversely, in the second half of the cylinders the first exhaust ducts AK1 of the associated cylinders Z2 and Z3 are connected to the second turbine inlet T2, while the second exhaust ducts AK2 are connected to the first turbine inlet T2. In conjunction with separate control of the first and second exhaust valves, described below in greater detail, dynamic operation of the exhaust gas turbocharger is thus made possible while avoiding so-called turbo lag.

The exhaust gas turbocharger is preferably designed as a so-called twin scroll turbocharger or as a segment turbocharger. An asymmetric design may also be provided, in which less than or more than one-half of the turbine blades are acted on by exhaust gas flowing into the first turbine inlet T1 or into the second turbine inlet T2. For example, in one embodiment as a segment turbine having ten blades, exhaust gas flowing into the first turbine inlet T1 or into the second turbine inlet T2 may act on four or six blades. For a segment turbine having seven blades, four and three blades may analogously be acted on by exhaust gas entering through the first turbine inlet T1 or the second turbine inlet T2. Corresponding turbocharger embodiments are known to those skilled in the art, and therefore are not discussed here in greater detail.

A preferred operation of the engine 1, in particular with regard to valve control, is explained in greater detail with reference to FIG. 2.

Figure 2:
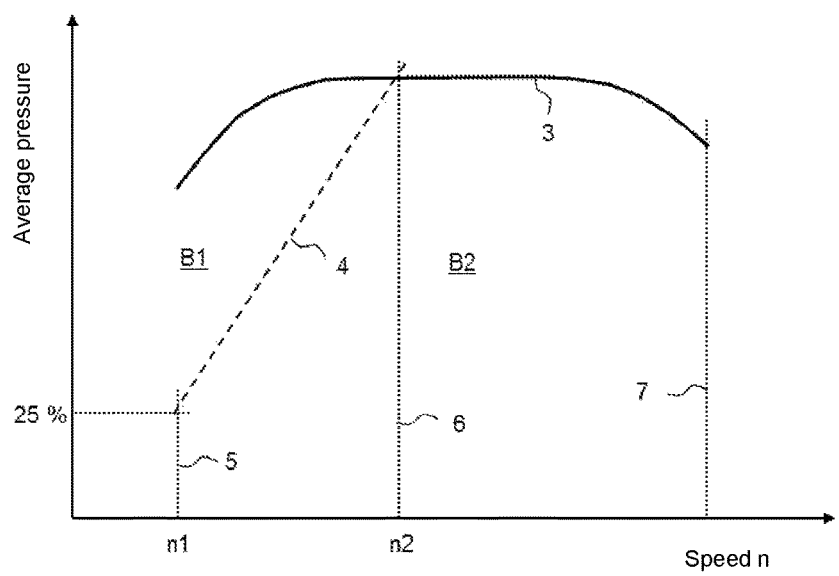
FIG. 2 shows a load-speed characteristic map of the engine according to FIG. 1 with indicated operating ranges.

FIG. 2 schematically shows a load-speed characteristic map of the engine 1, in which a characteristic curve 3 represents a nominal value of an average engine pressure as a function of the engine speed. A line 4 denotes an operating range limit which separates a first operating range B1 with comparatively low speeds from a second operating range B2 with comparatively higher speeds. The line 4 of the operating range limit extends through a first operating point at approximately 25% of the nominal load and a first speed n1, and through a second operating point situated on the full load characteristic curve 3 and at a second speed n2. The first speed n1 is approximately 15% of the nominal speed, and the second speed n2 is approximately 50% of the nominal speed.

In the operating range B1, the engine 1 is operated according to the invention in such a way that only one of the two exhaust valves of each cylinder Z1-Z4 is actuated, while the other exhaust valve keeps the associated exhaust opening closed over all four power strokes. This allows a thermodynamically favorable operation of the engine 1 and a dynamic response of the exhaust gas turbocharger. However, with increasing speed in the first operating range B1, the exhaust gas back pressure rises relatively sharply and the exhaust gas is discharged increasingly less favorably, thus decreasing the thermodynamic efficiency of the engine 1. For this reason, upon reaching the operating range limit in the second operating range B2, the engine 1 is operated in such a way that both exhaust valves are actuated. However, in particular at low speeds, the residual gas content in the cylinders increases due to a transverse influence of adjacent cylinders in relation to the firing order, which likewise has an unfavorable effect on the thermodynamic efficiency of the engine 1. This disadvantage is addressed according to the invention in that the second exhaust openings A2 of the cylinders Z1-Z4 are designed to be larger than the first exhaust openings A1. Thus, the valve disk diameters of the second exhaust valves associated with the second exhaust openings A2 are designed to be larger than the valve disk diameters of the first exhaust valves associated with the first exhaust openings A1. It is preferred to select the diameter of the second exhaust openings A2 to be at least 10%, preferably even at least 15%, larger than the diameter of the first exhaust openings A1. The same applies for the valve disk diameter of the associated exhaust valves. This measure allows much better purging of residual gas from the cylinders, and thus, a corresponding improvement in the thermodynamic efficiency of the engine. It is preferred when only the second exhaust valves having the larger valve disk diameters are actuated in the first operating range B1. The first exhaust openings A1 are thus continually kept closed by the nonactuated first exhaust valves.

The combustion and/or turbocharger operation or engine efficiency may be further improved by the following measures. First, it is advantageous when, as illustrated in FIG. 1, the second intake openings E2 and thus the valve disk diameters of the second intake valves are selected to be larger than the first intake openings E1 or the valve disk diameters of the first intake valves. The size difference, analogously to that of the exhaust valves, is then likewise selected to be at least 10%, but preferably at least 15%, larger. It is preferred when the second, larger exhaust openings A2 are situated diagonally opposite from the second, larger intake openings E2 in a top view of the cylinder head 2. In general, it is preferably provided to design the intake openings E1 and E2 to be slightly larger, i.e., approximately 10% to 20% larger, than the corresponding exhaust openings A1, A2. In addition, it is preferably provided to adapt the intake ducts EK1, EK2 and/or the exhaust ducts AK1, AK2 over the major portion of their length to the diameter of the intake openings E1, E2 or to the diameter of the exhaust openings A1, A2, respectively. That is, the diameter of the first intake duct EK1, at least over the major portion of its length, is selected to be smaller than the diameter of the second intake duct EK2, corresponding approximately to the diameter ratio of the intake valve openings E1, E2. The same may apply for the exhaust ducts AK1, AK2.

Furthermore, it may be provided that the first intake duct EK1 is designed as a swirl duct or turbulence duct, and the second intake duct EK2 is designed as a filling duct. This is particularly advantageous when the first intake duct EK1 is designed with a smaller diameter, the same as the second intake duct EK2. The second intake duct EK2, designed as a filling duct, is then preferably aligned, in relation to its center axis, with the second intake opening E2, approximately in the direction of the vertical cylinder axis. The first intake duct EK1 is preferably oriented at a comparatively greater angle with respect to the vertical cylinder axis in order to impart a swirl motion about the vertical cylinder axis or a tumble motion about a transverse cylinder axis to exhaust gas entering the combustion chamber.

With regard to the operation of the engine 1, it may be provided to actuate both intake valves of each cylinder Z1-Z4 over both operating ranges B1 and B2. However, it may also be provided, in the first operating range B1, to actuate only one of the two intake valves, and with the other intake valve, to continually keep the respective intake opening closed. In the case of two intake openings having different sizes, it is preferred to actuate only the larger, second intake valves in the first operating range B1. In addition, a middle operating range B3 may be provided which with regard to its load and speed values is situated below the second operating range B2. The first operating range B1 may then be shifted to lower loads and speeds. With such a division, it is preferably provided to actuate only the first exhaust valve associated with the smaller, first exhaust duct AK1 in the lower, first operating range B1. In the middle operating range B3, only the second exhaust valve associated with the larger, second exhaust duct AK2 is then actuated, and in the upper, second operating range B2, both exhaust valves are actuated.

The invention claimed is:

1. A four-stroke reciprocating piston internal combustion engine, comprising:
    an even number of cylinders, wherein the even number of cylinders is grouped into a first half of the even number of cylinders and a second half of the even number of cylinders; and
    an exhaust gas turbocharger with a first turbine inlet and a second turbine inlet which are separate from one another;
    wherein each of the even number of cylinders have:
        an intake duct with an intake opening;
        a first exhaust duct with a first exhaust opening; and
        a second exhaust duct with a second exhaust opening;
    wherein the first half of the even number of cylinders is connected via the respective first exhaust ducts to the first turbine inlet and is connected via the respective second exhaust ducts to the second turbine inlet;
    wherein the second half of the even number of cylinders is connected via the respective first exhaust ducts to the second turbine inlet and is connected via the respective second exhaust ducts to the first turbine inlet;
    wherein the respective second exhaust openings have a larger diameter than the respective first exhaust openings; and wherein the even number of cylinders includes a first cylinder, a second cylinder, a third cylinder, and a fourth cylinder disposed in series, wherein the first cylinder and the fourth cylinder form the first half of the even number of cylinders, wherein the second cylinder and the third cylinder form the second half of the even number of cylinders, and wherein a firing order of the even number of cylinders is the first cylinder then the third cylinder then the fourth cylinder and then the second cylinder.

2. The four-stroke reciprocating piston internal combustion engine according to claim 1, wherein the respective intake ducts each include a first intake duct with a first intake opening and a second intake duct with a second intake opening.

3. The four-stroke reciprocating piston internal combustion engine according to claim 2, wherein the respective second intake openings have a larger diameter than the respective first intake openings.

4. The four-stroke reciprocating piston internal combustion engine according to claim 2, wherein the respective first intake ducts are a swirl duct or a turbulence duct and wherein the respective second intake ducts are a filling duct.

5. The four-stroke reciprocating piston internal combustion engine according to claim 3, wherein the respective second intake openings are disposed diagonally opposite from the respective second exhaust openings in a view of the even number of cylinders from a top.

6. An operating method for a four-stroke reciprocating piston internal combustion engine according to claim 1, comprising the step of:
keeping the respective first exhaust openings or the respective second exhaust openings closed at a speed which is below a predefined lower engine speed limit.

7. The operating method according to claim 6, wherein the predefined lower engine speed limit, as a function of a load, is predefined between approximately 15% and 50% of a nominal speed of the four-stroke reciprocating piston internal combustion engine.

8. The operating method according to claim 6, wherein the respective intake duct includes a first intake duct with a first intake opening and a second intake duct with a second intake opening, wherein the respective second intake openings have a larger diameter than the respective first intake openings, and further comprising the step of closing the respective first intake openings at the speed which is below the predefined lower engine speed limit.

* * * * *